United States Patent Office 2,911,437
Patented Nov. 3, 1959

2,911,437

PREPARATION OF GLYCEROL TRIESTERS

Willis C. Keith, Lansing, Ill., assignor to Sinclair Refining Company, New York, N.Y., a corporation of Maine No Drawing. Application April 2, 1957
Serial No. 650,096

5 Claims. (Cl. 260—491)

My invention relates to a method for the preparation of tri-esters of glycerol by the oxidation of allyl acetate.

Allyl acetate is a well-known material, having a boiling point at atmospheric pressure of 104° C. In accordance with my invention, I oxidize the allyl acetate with oxygen while the allyl acetate is in admixture with an acid of the class RCOOH wherein R is hydrogen or an alkyl radical containing from 1 to 3 carbon atoms and thereby form tri-esters of glycerol of the class

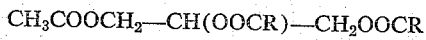
$CH_3COOCH_2—CH(OOCR)—CH_2OOCR$ wherein as before R is hydrogen or an alkyl radical containing from 1 to 3 carbon atoms. The tri-esters of glycerol are useful materials, inasmuch as they can be hydrolyzed with water to produce glycerol, acetic acid and perhaps another acid, depending upon the acid with which the allyl acetate is admixed when undergoing oxidation. Where the allyl acetate is oxidized while in admixture with acetic acid, the tri-ester produced is glycerol tri-acetate or triacetin. Triacetin is a useful solvent for the antiseptic chloroazodin and it is also useful as a camphor substitute in the pyroxylin industries, as a plasticizer, and in the manufacture of cosmetics.

I am aware that in United States Patent No. 2,316,604 it has been proposed to oxidize allyl acetate while in admixture with acetic acid in the presence of an oxidation catalyst and an initiator, such as a peroxide or free radical-producing substance. More specifically, the patent teaches that copper acetate along with methyl ethyl ketone will be catalysts for the reaction, and rather severe conditions (110–155° C. and 80 atmospheres) are used. I have substantiated the severity of the reaction conditions required for this reaction. I have run experiments at atmospheric pressure at about 100° C. employing a cobalt catalyst and both methyl ethyl ketone and peroxide initiators. These experiments were run using acetic acid and acetic anhydride with pure oxygen as the oxidizing gas. After several hours at reaction conditions, no measurable amount of reaction took place. In contrast, various other olefins such as cyclohexene, heptenes, octenes and alpha-methylstyrene oxidized quite readily under these conditions.

In accordance with my invention, I have discovered that various metal bromides, particularly cobaltous bromide, are active catalysts for the oxidation of allyl acetate when admixed with monocarboxylic acids to produce tri-esters of glycerol. At atmospheric pressure and at 100° C., the oxidation of allyl acetate while admixed with acetic acid to produce triacetin is an extremely fast reaction. Hence, my invention is a method for the manufacture of tri-esters of glycerol by passing molecular oxygen into a liquid phase mixture of allyl acetate and a lower monocarboxylic acid, the reaction mixture also containing as an oxidation catalyst a bromide of any of various metals. The molecular oxygen introduced into the reaction system can be pure gaseous oxygen or, on the other hand, it can be any of various other gases containing free oxygen, such as air or air which has been enriched with oxygen. The monocarboxylic acid which I use is of the type RCOOH wherein R is hydrogen or an alkyl radical containing from 1 to 3 carbon atoms. As the acid, I prefer to use acetic acid, but in its place there can be employed other acids which conform to the generic formula just given, for example, formic acid, propionic acid, n-butyric acid and so forth. The relative amounts of allyl acetate and monocarboxylic acid present in the reaction mixture can be varied widely, but in general the weight ratio of allyl acetate to monocarboxylic acid will be within the range from 1:10 to 10:1 and preferably from 1:3 to 3:1.

A wide variety of metal bromide catalysts can be used when my process is carried out. The bromides which I employ are those of metals which have atomic numbers within the range from 23 through 28 and within the range from 58 through 71. Thus, among the metal bromides which are useful catalysts are those of vanadium, chromium, manganese, iron, cobalt, nickel, cerium, praseodymium, promethium, samarium, terbium, thulium and the like. In addition, the bromides of molybdenum (atomic number 42), tungsten (atomic number 74) and tin (atomic number 50) are also useful catalytic materials. For example, ferrous bromide, ferric bromide, cobaltous bromide, nickel bromide, molybdenum dibromide, molybdenum tribromide, molybdenum tetrabromide, tungsten dibromide, tungsten pentabromide, tungsten hexabromide, stannous bromide and stannic bromide are useful. The amount of catalyst present in the reaction system can be varied widely and will generally be from about 0.5 to 5 percent by weight, based upon the weight of the allyl acetate employed as a starting material, but smaller and larger amounts of catalyst are also effective. The catalyst can be introduced into the reaction zone as such or it can be prepared in situ, as by introducing the free metal in powdered form into the reaction zone and thereafter passing in hydrogen bromide. The catalyst can also be prepared in situ by introducing an appropriate metal compound into the reaction system, for example, cobaltous acetate, and then introducing hydrogen bromide.

The reaction between the oxygen and the allyl acetate is carried out while the allyl acetate is in liquid phase. The reaction temperature employed should be held within the range from 25° C. to 200° C., pressure being applied, if necessary, to maintain the allyl acetate in the liquid phase.

The following examples illustrate an embodiment which falls within the scope of my invention.

Example I

This experiment was run at atmospheric pressure in a glass jacketed tube reactor. The reaction temperature was controlled at 100° C. throughout the experiment. 200 grams of allyl acetate, 450 grams of glacial acetic acid and 3.71 grams of cobaltous bromide were charged to the reactor and the mixture was heated to 100° C. Pure oxygen was then introduced into the reactor below the surface of the liquid reaction mixture at the rate of 0.5 standard cubic feet per hour. Initially, all of the oxygen was consumed, but after a period of time oxygen introduced into the mixture passed through unchanged. During the course of the reaction, a small quantity of gaseous hydrogen bromide (a total of 1.9 grams) was introduced into the reaction zone, along with the oxygen. The reaction was allowed to continue for six hours, following which the reaction mixture was distilled. Essentially complete conversion of the allyl acetate took place. A yield of 116 grams of glycerol triacetate was obtained, this being accomplished by distilling the glycerol triacetate overhead from the reaction mixture, at an absolute presusre of approximately 13 mm. of mercury.

Example II

This experiment to produce glycerol triacetate was run at atmospheric pressure in a glass 4-neck fluted flask equipped with a thermowell, condenser, stirrer and gas dispersive tube. 400 grams of allyl acetate, 200 grams of glacial acetic acid and 7.48 grams of cobaltous bromide were charged to the reactor and the mixture was heated to 108° C. and maintained at this temperature throughout the reaction. Pure oxygen was then introduced into the reactor below the surface of the liquid reaction mixture, which contained the catalyst in solution, at the rate of 0.5 standard cubic foot per hour. The reaction was allowed to continue for six hours. During the course of the reaction 34.5 grams of oxygen were consumed and no measureable amounts of CO and $CO_2$ were formed.

I claim:

1. A method for the manufacture of a tri-ester of glycerol which comprises passing molecular oxygen into a liquid phase mixture of allyl acetate and a monocarboxylic acid of the class RCOOH wherein R is selected from the group consisting of hydrogen and alkyl radicals containing from 1 to 3 carbon atoms, the said mixture also containing a catalytic amount of a bromide of a metal selected from the group consisting of those metals having atomic numbers of from 23 through 28, 42, 74, 50 and 58 through 71 and the said mixture being maintained at a temperature of from 25° C. to 200° C.

2. The method of claim 1 wherein said monocarboxylic acid is acetic acid.

3. The method of claim 1 wherein said metal is cobalt.

4. A method for the manufacture of glycerol triacetate which comprises passing molecular oxygen into a liquid phase mixture of allyl acetate and acetic acid in a weight ratio of allyl acetate to acetic acid within the range from 1:10 to 10:1, the said mixture also containing from 0.5 to 5 percent by weight of cobaltous bromide, based upon the weight of the allyl acetate, and the said mixture being maintained at a temperature of from 25° C. to 200° C.

5. The method of claim 4 wherein the weight ratio of allyl acetate to acetic acid is within the range from 1:3 to 3:1.

References Cited in the file of this patent

UNITED STATES PATENTS

| | | |
|---|---|---|
| 2,316,604 | Loder et al. | Apr. 13, 1943 |
| 2,444,924 | Farkas et al. | July 13, 1948 |